US012560670B2

(12) United States Patent
Yasuda

(10) Patent No.: US 12,560,670 B2
(45) Date of Patent: Feb. 24, 2026

(54) MODEL LEARNING DEVICE, DIRECTION OF ARRIVAL ESTIMATION DEVICE, MODEL LEARNING METHOD, DIRECTION OF ARRIVAL ESTIMATION METHOD, AND PROGRAM

(71) Applicant: NTT, Inc., Tokyo (JP)

(72) Inventor: Masahiro Yasuda, Tokyo (JP)

(73) Assignee: NTT, Inc., Tokyo (JP)

( * ) Notice: Subject to any disclaimer, the term of this patent is extended or adjusted under 35 U.S.C. 154(b) by 111 days.

(21) Appl. No.: 18/276,860

(22) PCT Filed: Feb. 17, 2021

(86) PCT No.: PCT/JP2021/005849
§ 371 (c)(1),
(2) Date: Aug. 10, 2023

(87) PCT Pub. No.: WO2022/176045
PCT Pub. Date: Aug. 25, 2022

(65) Prior Publication Data
US 2024/0118363 A1      Apr. 11, 2024

(51) Int. Cl.
*G01S 3/808* (2006.01)
*G10K 11/175* (2006.01)
(52) U.S. Cl.
CPC ........ *G01S 3/8083* (2013.01); *G10K 11/1752* (2020.05)

(58) Field of Classification Search
CPC .......................... G01S 3/8083; G10K 11/1752
See application file for complete search history.

(56) References Cited

PUBLICATIONS

"Masahiro Yasuda, Sound Event Localization Based on Sound Intensity Vector Refined By DNN-Based Denoising and Source Separation, Feb. 14, 2020, NTT Media Intelligence Laboratories" (Year: 2020).*
Yasuda, Masahiro et al. (2020) "Sound Event Localization Based on Sound Intensity Vector Refined By DNN-Based Denoising and Source Separation" ICASSP 2020, pp. 651-655.
Adavanne et al. (2019) "Sound event localization and detection of overlapping sources using convolutional recurrent neural networks" IEEE Journal of Selected Topics in Signal Processing, vol. 13, No. 1, Mar. 2019, pp. 34-48.

(Continued)

*Primary Examiner* — Abdallah Abulaban

(57) ABSTRACT

A method and a device for estimating a direction-of-arrival of a sound source and for learning a model are described. Operations for the estimating comprises estimating a reverberation component of an acoustic intensity vector, extracting an angle mask, estimating a time-frequency mask for noise suppression and sound source separation. A first direction-of-arrival of a sound source is estimated by applying the time-frequency mask to the acoustic intensity vector. A second direction-of-arrival of the sound source is estimated by applying the angle mask to the acoustic intensity vector. A cost function of a model is calculated based on the first and second direction-of-arrivals of the sound source and a label. Embodiments further describe updating a parameter of the model based on the cost function for learning the model.

6 Claims, 6 Drawing Sheets

(56)        References Cited

PUBLICATIONS

Xu et al. (2017) "Surrey-CVSSP System for DCASE2017 Challenge TASK4" in Detection and Classification of Acoustic Scenes and Events, Nov. 16, 2017, Munich, Germany.

Lee et al. (2017) "Ensemble of convolutional neural networks for weakly-supervised sound event detection using multiple scale input", in Tech. report of Detection and Classification of Acoustic Scenes and Events 2017 (DCASE) Nov. 16, 2017, Munich, Germany.

Chang et al. (2018) "Feature Extracted DOA Estimation Algorithm Using Acoustic Array for Drone Surveillance", in Proc. of IEEE 87th Vehicular Technology Conference.

Adavanne et al. (2018) "Direction of arrival estimation for multiple sound sources using convolutional recurrent neural network", in Proc. of IEEE 26th European Signal Processing Conference.

Kapka et al. (2019) "Sound source detection, localization and classification using consecutive ensemble of CMN models", in Tech. report of Detection and Classification of Acoustic Scenes and Events 2019 (DCASE) Challange.

Cao et al. (2019) "Two-stage sound event localization and detection using intensity vector and generalized cross-correlation", in Tech. report of Detection and Classification of Acoustic Scenes and Events 2019 (DCASE) Challange.

Noh et al. (2019) "Three-stage approach for sound event localization and detection", in Tech. report of Detection and Classification of Acoustic Scenes and Events 2019 (DCASE) Challange.

Nguyen et a. (2019) DCASE 2019 task 3: A two-step system for sound event localization and detection, in Tech. report of Detection and Classification of Acoustic Scenes and Events 2019 (DCASE) Challange.

Schmidt (1986) "Multiple emitter location and signal parameter estimation", IEEE Transactions on Antennas and propagation, vol. 34, pp. 276-280.

Ahonen et al. (2007)"Teleconference application and B-format microphone array for directional audio coding", in Proc. of AES 30th International Conference: Intelligent Audio Environments.

Kitic et al. (2018) "Tramp: Tracking by a realtime ambisonic-based particle filter", in Proc. of LOCATA Challenge Workshop, a satellite event of IWAENC.

Jarrett et al. (2010) "3d source localization in the spherical harmonic domain using a pseudointensity vector", in Proc. of European Signal Processing Conference.

"DCASE2019 Workshop Workshop on Detection and Classification of Acoustic Scenes and Events," [online], Oct. 25-26, 2019, [Searched on Feb. 8, 2021], Internet URL:http:/dcase.community/workshop2019/.

Yilmaz et al. (2004) "Blind separation of speech mixtures via time-frequency masking", IEEE Trans. Signal Process., vol. 52, pp. 1830-1847, Jul. 2004.

* cited by examiner

FIG.2

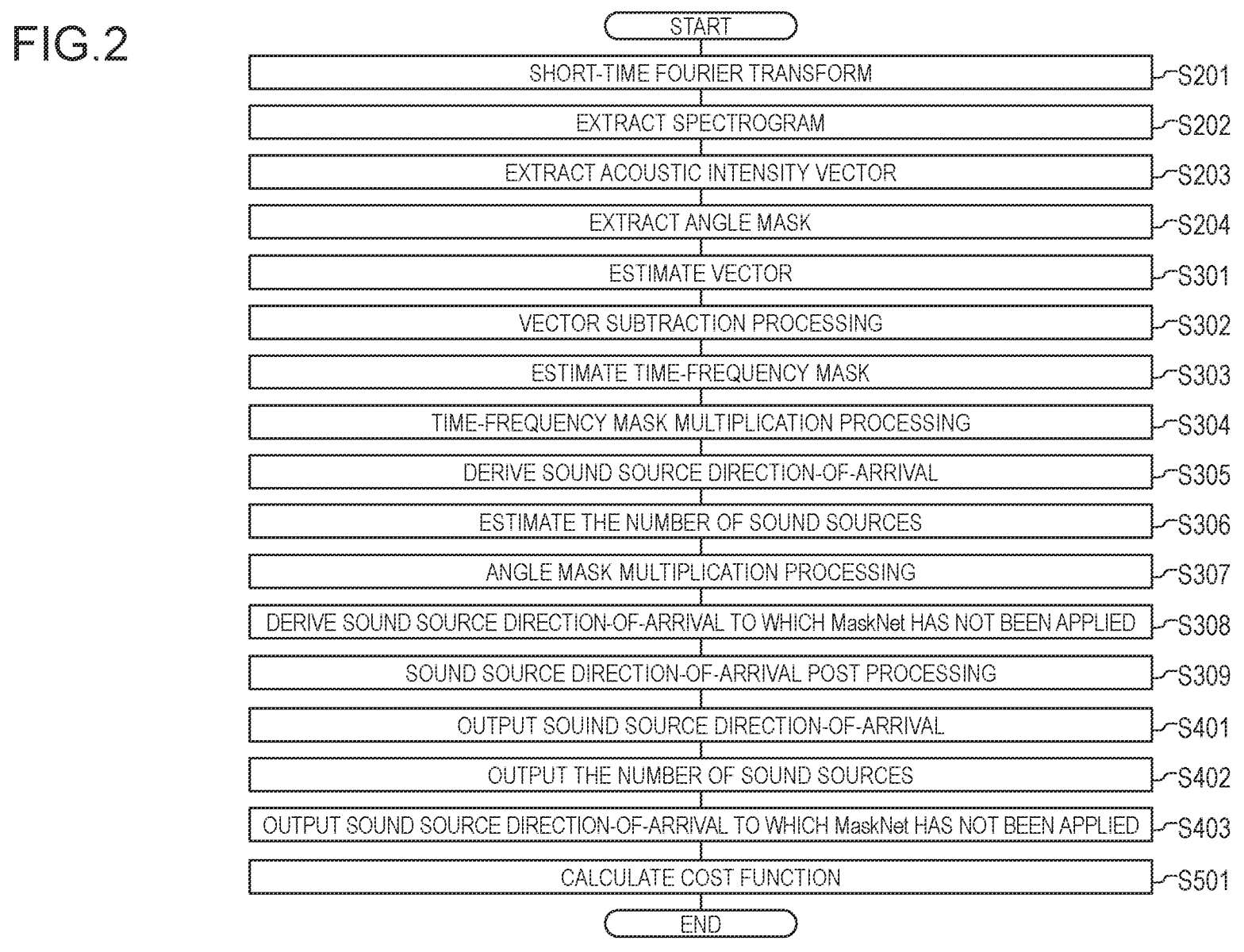

START

SHORT-TIME FOURIER TRANSFORM — S201

EXTRACT SPECTROGRAM — S202

EXTRACT ACOUSTIC INTENSITY VECTOR — S203

EXTRACT ANGLE MASK — S204

ESTIMATE VECTOR — S301

VECTOR SUBTRACTION PROCESSING — S302

ESTIMATE TIME-FREQUENCY MASK — S303

TIME-FREQUENCY MASK MULTIPLICATION PROCESSING — S304

DERIVE SOUND SOURCE DIRECTION-OF-ARRIVAL — S305

ESTIMATE THE NUMBER OF SOUND SOURCES — S306

ANGLE MASK MULTIPLICATION PROCESSING — S307

DERIVE SOUND SOURCE DIRECTION-OF-ARRIVAL TO WHICH MaskNet HAS NOT BEEN APPLIED — S308

SOUND SOURCE DIRECTION-OF-ARRIVAL POST PROCESSING — S309

OUTPUT SOUND SOURCE DIRECTION-OF-ARRIVAL — S401

OUTPUT THE NUMBER OF SOUND SOURCES — S402

OUTPUT SOUND SOURCE DIRECTION-OF-ARRIVAL TO WHICH MaskNet HAS NOT BEEN APPLIED — S403

CALCULATE COST FUNCTION — S501

END

FIG. 3

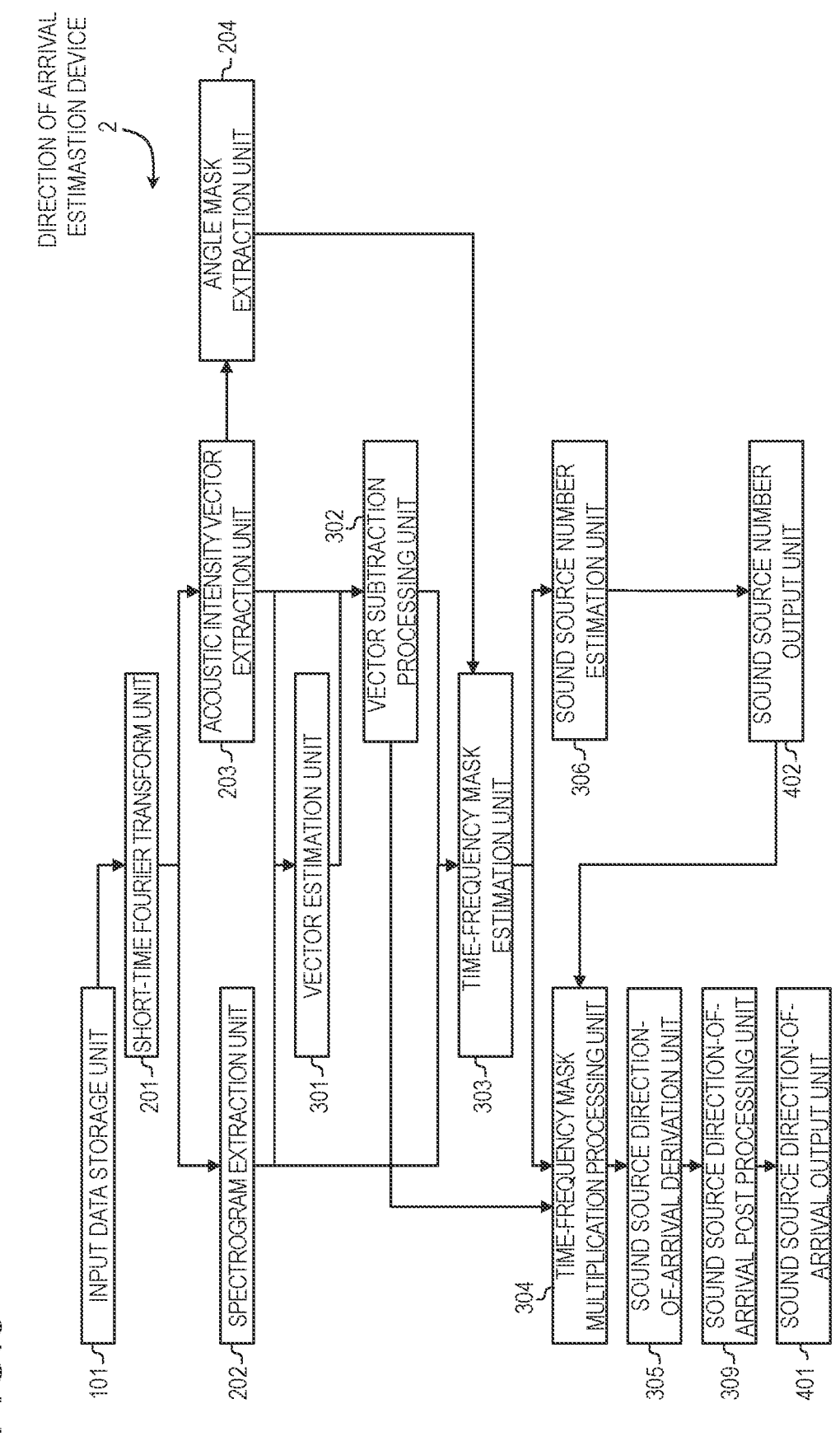

DIRECTION OF ARRIVAL
ESTIMASTION DEVICE
2

204  ANGLE MASK EXTRACTION UNIT

101  INPUT DATA STORAGE UNIT

201  SHORT-TIME FOURIER TRANSFORM UNIT

203  ACOUSTIC INTENSITY VECTOR EXTRACTION UNIT

202  SPECTROGRAM EXTRACTION UNIT

301  VECTOR ESTIMATION UNIT

302  VECTOR SUBTRACTION PROCESSING UNIT

303  TIME-FREQUENCY MASK ESTIMATION UNIT

306  SOUND SOURCE NUMBER ESTIMATION UNIT

402  SOUND SOURCE NUMBER OUTPUT UNIT

304  TIME-FREQUENCY MASK MULTIPLICATION PROCESSING UNIT

305  SOUND SOURCE DIRECTION-OF-ARRIVAL DERIVATION UNIT

309  SOUND SOURCE DIRECTION-OF-ARRIVAL POST PROCESSING UNIT

401  SOUND SOURCE DIRECTION-OF-ARRIVAL OUTPUT UNIT

F I G. 4

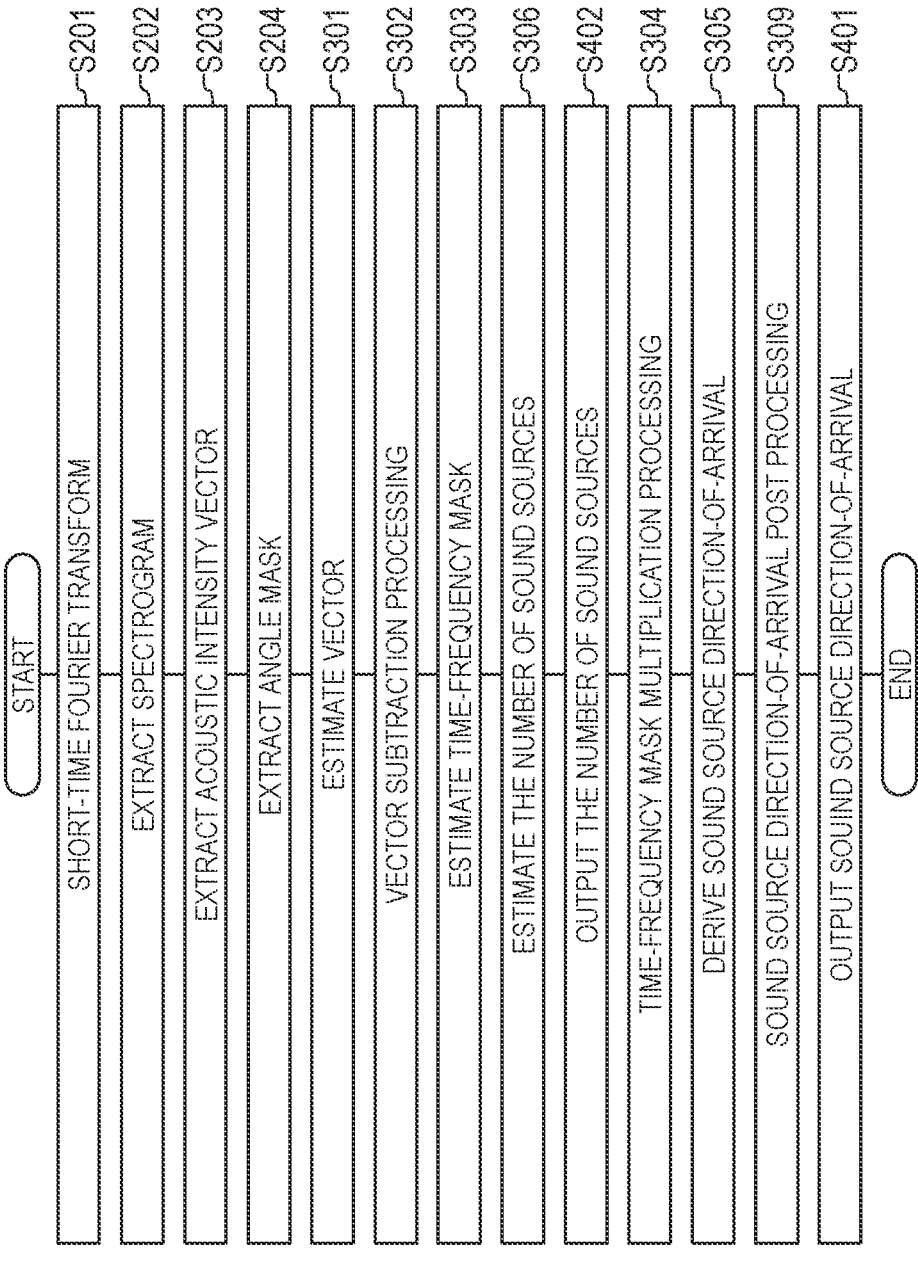

START

SHORT-TIME FOURIER TRANSFORM — S201

EXTRACT SPECTROGRAM — S202

EXTRACT ACOUSTIC INTENSITY VECTOR — S203

EXTRACT ANGLE MASK — S204

ESTIMATE VECTOR — S301

VECTOR SUBTRACTION PROCESSING — S302

ESTIMATE TIME-FREQUENCY MASK — S303

ESTIMATE THE NUMBER OF SOUND SOURCES — S306

OUTPUT THE NUMBER OF SOUND SOURCES — S402

TIME-FREQUENCY MASK MULTIPLICATION PROCESSING — S304

DERIVE SOUND SOURCE DIRECTION-OF-ARRIVAL — S305

SOUND SOURCE DIRECTION-OF-ARRIVAL POST PROCESSING — S309

OUTPUT SOUND SOURCE DIRECTION-OF-ARRIVAL — S401

END

MODEL LEARNING DEVICE, DIRECTION OF ARRIVAL ESTIMATION DEVICE, MODEL LEARNING METHOD, DIRECTION OF ARRIVAL ESTIMATION METHOD, AND PROGRAM

CROSS-REFERENCE TO RELATED APPLICATIONS

This application is a U.S. 371 Application of International Patent Application No. PCT/JP2021/005849, filed on 17 Feb. 2021, the disclosure of which is hereby incorporated herein by reference in its entirety.

TECHNICAL FIELD

The present invention relates to sound source direction-of-arrival (DOA) estimation, and relates to a model learning device, a direction of arrival estimation device, a model learning method, a direction of arrival estimation method, and a program.

BACKGROUND ART

Sound event localization and detection (SELD) is a task of identifying when, where, and what kind of acoustic event has occurred from an acoustic signal acquired by a microphone array (Non Patent Literature 1). The SELD is a technology in which artificial intelligence (AI) serves as a basis for understanding the surrounding environment, and its application to security using an autonomous vehicle or a drone has been studied (Non Patent Literatures 2, 3, and 4).

Sound source direction-of-arrival (DOA) estimation is used in an SELD task to specify a relative position of a sound source with respect to a microphone at each time. In most recent DOA estimation techniques, a data-driven approach using a deep neural network (DNN) as a regression function for directly estimating an azimuth angle and an elevation angle from observation has been adopted (Non Patent Literatures 5, 6, 7, and 8). Although this approach has achieved high accuracy because of the high expressive power of DNNs, DOA estimation of overlapping sounds is still difficult for fully data-driven approaches (Non Patent Literatures 5 and 6). On the other hand, the DOA estimation accuracy of a physics-based approach is inferior to that of the DNN-based technique for a single sound source, but has an advantage of having robustness against overlapping sounds (Non Patent Literature 9).

Various techniques such as a MUSIC method or a technique based on an acoustic intensity vector (IV) have been proposed as physics-based DOA estimation techniques (Non Patent Literatures 10, 11, and 12). A MUSIC method (Non Patent Literature 11) enables accurate DOA estimation for multiplex sounds, and an IV-based technique (Non Patent Literatures 11 and 12) has satisfactory time-angle resolution. These properties are important advantages in a DOA technique used for an SELD task. However, it is known that the accuracy of these DOA estimation techniques decreases as the signal-to-noise ratio (SNR) decreases due to stationary noise or the like (Non Patent Literature 5).

<DOA Estimation Based on Acoustic Intensity Vector>

Ahonen et al. have proposed a DOA estimation method using an IV calculated from a first-order Ambisonics B format (Non Patent Literature 11). The first-order Ambisonics B format is composed of four-channel signals, and the outputs $W_{f,t}$, $X_{f,t}$, $Y_{f,t}$, and $Z_{f,t}$ of its short-time Fourier transform (STFT) correspond to zeroth-order and first-order spherical harmonics. Here, $f \in \{1, \ldots, F\}$ and $t \in \{1, \ldots, T\}$ are the frequency and time indices of the T-F domain, respectively. Zeroth-order $W_{f,t}$ corresponds to the omnidirectional sound source, and first-order $X_{f,t}$, $Y_{f,t}$, and $Z_{f,t}$ correspond to dipoles along respective axes.

The spatial responses (steering vectors) of $W_{f,t}$, $X_{f,t}$, $Y_{f,t}$, and $Z_{f,t}$ are defined as follows.

[Math. 1]

$$H_{(W)}(\phi,\theta,f)=3^{-1/2},$$

$$H^{(X)}(\phi,\theta,f)=\cos\phi^*\cos\theta,$$

$$H^{(Y)}(\phi,\theta,f)=\sin\phi^*\cos\theta,$$

$$H^{(Z)}(\phi,\theta,f)=\sin\theta. \tag{1}$$

Here, $\phi$ and $\theta$ represent an azimuth angle and an elevation angle, respectively. An IV is a vector determined by the acoustic particle velocity $v=[v_x, v_y, v_z]^T$ and the sound pressure $p_{f,t}$, and is expressed as follows in the T-F space.

[Math. 2]

$$I_{f,t} = \frac{1}{2}R(p^*_{f,t} \cdot v_{f,t}). \tag{2}$$

Here, $R(\cdot)$ represents a real part of a complex number, and * represents a complex conjugate. Actually, since it is impossible to measure the acoustic particle velocity and the sound pressure at all points in the space, it is difficult to obtain the IV by directly applying Formula (2). Therefore, Formula (2) is approximated as follows using a 4-channel spectrogram obtained from the first-order Ambisonics B format (Non Patent Literature 13).

[Math. 3]

$$I_{f,t} \propto R\left(W^*_{f,t}\begin{bmatrix} X_{f,t} \\ Y_{f,t} \\ Z_{f,t} \end{bmatrix}\right) = \begin{bmatrix} I_{X,f,t} \\ I_{Y,f,t} \\ I_{Z,f,t} \end{bmatrix} \tag{3}$$

In order to select the time-frequency domain effective for the DOA estimation, Ahonen et al. have applied a time-frequency mask $M_{t,f}$ for the IV as follows.

[Math. 4]

$$M_{f,t} = \frac{1}{2\rho_o c^2}\left(|W_{f,t}|^2 + \frac{|X_{f,t}|^2 + |Y_{f,t}|^2 + |Z_{f,t}|^2}{3}\right) \tag{4}$$

This mask is intended to select a time-frequency bin which is a signal intensity and has a high intensity. Accordingly, assuming that the target signal has a sufficiently larger intensity than the environmental noise, this time-frequency mask will select the time-frequency domain effective for the DOA estimation. Furthermore, they calculate the time series of the IV for each Bark scale in a domain of 300 to 3400 Hz as follows.

[Math. 5]

$$I_t = \frac{\sum_{f=f_l}^{f=f_h} I_{f,t} \cdot M_{f,t}}{(f_h - f_l)\sum_{f=f_l}^{f=f_h} M_{f,t}} = \begin{bmatrix} I_{X,t} \\ I_{Y,t} \\ I_{Z,t} \end{bmatrix}, \qquad (5)$$

Here, $f_l$ and $f_h$ represent the upper limit and the lower limit of each Bark scale. Finally, the azimuth angle and the elevation angle of the target sound source at each time frame t are calculated as follows.

[Math. 6]

$$\phi_t = \arctan\left(\frac{I_{Y,t}}{I_{X,t}}\right) \qquad (6)$$

$$\theta_t = \arctan\left(\frac{I_{z,t}}{\sqrt{I_{X,t}^2 + I_{Y,t}^2}}\right).$$

<DOA Estimation Based on DNN>

Most DOA estimation based on a DNN uses a DNN as a regression function for directly estimating an azimuth angle and an elevation angle. Many participants of the DCASE Challenge 2019 Task 3 (Non Patent Literature 14) have used a fully data-driven approach for DOA estimation and have achieved satisfactory accuracy (Non Patent Literatures 6, 7, and 8). In these methods, the structure of the DNN is a combination of a multilayer CNN and a bidirectional gated recurrent unit (Bi-GRU), which enables the extraction of higher-order features and modeling of time structures. Moreover, the DNN model is also learned to minimize loss functions such as a mean absolute error (MAE) between true and estimated DOA labels. However, in such a data-driven DNN-based method, it has been reported that DOA estimation of overlapping sounds is difficult and the accuracy is much lower than that of the case of a single sound source (Non Patent Literatures 5 and 6).

CITATION LIST

Non Patent Literature

Non Patent Literature 1: S. Adavanne, A. Politis, J. Nikunen, and T. Virtanen, "Sound event localization and detection of overlapping sources using convolutional recurrent neural networks", IEEE Journal of selected topics in signal processing, vol. 13.

Non Patent Literature 2: Y. Xu, Q. Kong, W. Wang, and M. D. Plumbley, "Surrey-cvssp system for dcase 2017 challenge task4", inTech. report of Detection and Classification of Acoustic Scenes and Events 2017(DCASE) Challange, 2017.

Non Patent Literature 3: D. Lee, S. Lee, Y. Han, and K. Lee, "Ensemble of convolutional neural networks for weakly-supervised sound event detection using multiple scale input", inTech. report of Detection and Classification of Acoustic Scenes and Events 2017 (DCASE) Challange, 2017.

Non Patent Literature 4: X. Chang, C. Yang, X. Shi, P. Li, Z. Shi, and J. Chen, "Feature extracted doa estimation algorithm using acoustic array for drone surveillance", in Proc. of IEEE 87th Vehicular Technology Conference, 2018.

Non Patent Literature 5: S. Adavanne, A. Politis, and T. Virtanen, "Direction of arrival estimation for multiple sound sources using convolutional recurrent neural network", in Proc. of IEEE 26th European Signal Processing Conference, 2018.

Non Patent Literature 6: S. Kapka and M. Lewandowski, "Sound source detection, localization and classification using consecutive ensemble of crnn models", inTech. report of Detection and Classification of Acoustic Scenes and Events 2019 (DCASE) Challange, 2019.

Non Patent Literature 7: Y. Cao, T. Iqbal, Q. Kong, M. B. Galindo, W. Wang, and M. D. Plumbley, "Twostage sound event localization and detection using intensity vector and generalized crosscorrelation", in Tech. report of Detection and Classification of Acoustic Scenes and Events 2019 (DCASE) Challange, 2019.

Non Patent Literature 8: K. Noh, J. Choi, D. Jeon, and J. Chang, "Three-stage approach for sound event localization and detection", in Tech. report of Detection and Classification of Acoustic Scenes and Events 2019 (DCASE) Challange, 2019.

Non Patent Literature 9: T. N. T. Nguyen, D. L. Jones, R. Ranjan, S. Jayabalan, and W. S. Gan, "Dcase 2019 task 3: A two-step system for sound event localization and detection", in Tech. report of Detection and Classification of Acoustic Scenes and Events 2019 (DCASE) Challange, 2019.

Non Patent Literature 10: R. O. Schmidt, "Multiple emitter location and signal parameter estimation", IEEE Transactions On Antennas and propagation, vol. 34, pp. 276-280, 1986.

Non Patent Literature 11: J. Ahonen, V. Pulkki, and T. Lokki, "Teleconference application and b-format microphone array for directional audio coding", in Proc. of AES 30th International Conference: Intelligent Audio Environments, 2007.

Non Patent Literature 12: S. Kitic and A. Guerin, "Tramp: Tracking by a real-time ambisonic-based particle filter", in Proc. of LOCATA Challenge Workshop, a satellite event of IWAENC, 2018.

Non Patent Literature 13: D. P. Jarrett, E. A. P. Habets, and P. A. Naylor, "3d source localization in the spherical harmonic domain using a pseudo intensity vector", in Proc. of European Signal Processing Conference, 2010.

Non Patent Literature 14: "DCASE2019 Workshop Workshop on Detection and Classification of Acoustic Scenes and Events," [online], 25-26 Oct. 2019, [Searched on Feb. 8, 2021], Internet <URL:http://dcase.community/workshop2019/>

Non Patent Literature 15: O. Yilmaz and S. Rickard, "Blind separation of speech mixtures via time-frequency masking", IEEE Trans. Signal Process., vol. 52, pp. 1830-1847, July. 2004.

SUMMARY OF INVENTION

Technical Problem

In a case where the above-described DOA estimation is performed in an offline operation, since the estimation is performed after the end of recording, it is also possible to perform estimation using future information after a certain time in order to perform estimation at the time. Actually, in many acoustic event localization techniques based on deep learning, a model structure that explicitly uses future information called a bidirectional recurrent neural network is adopted in order to improve the estimation accuracy.

In order to achieve online operation in view of practical use, it is impossible to perform estimation using such future information. In a situation where future information cannot be used, it is conceivable that the estimation accuracy deteriorates near the start time of the acoustic event due to lack of information. Moreover, although past information is available without limitation in principle, it is preferable in practice that estimation can be performed only with input information taking as short a time as possible in order to suppress the calculation amount.

Therefore, an object of the present invention is to provide a model learning device capable of performing sound source direction-of-arrival (DOA) estimation in online operation.

Solution to Problem

A model learning device according to the present invention includes: a vector estimation unit; an angle mask extraction unit; a time-frequency mask estimation unit; a first sound source direction-of-arrival derivation unit; a second sound source direction-of-arrival derivation unit; and a cost function calculation unit.

The vector estimation unit receives a real number spectrogram extracted from a complex spectrogram of acoustic data having a known sound source direction-of-arrival and a label indicating the sound source direction-of-arrival for each time, and an acoustic intensity vector extracted from the complex spectrogram as inputs, and outputs a reverberation component of the estimated acoustic intensity vector. The angle mask extraction unit receives the acoustic intensity vector as an input, and extracts, as an angle mask, a time-frequency mask for selecting a time-frequency bin having an azimuth angle larger than an azimuth angle derived in a state where noise suppression and sound source separation are not performed. The time-frequency mask estimation unit receives a real number spectrogram, an acoustic intensity vector from which a reverberation component has been subtracted, and an angle mask as inputs, and outputs a time-frequency mask for noise suppression and sound source separation. The first sound source direction-of-arrival derivation unit derives the sound source direction-of-arrival on the basis of the acoustic intensity vector obtained by applying the time-frequency mask to the acoustic intensity vector from which the reverberation component has been subtracted. The second sound source direction-of-arrival derivation unit derives the sound source direction-of-arrival on the basis of the acoustic intensity vector obtained by applying the angle mask to the acoustic intensity vector from which the reverberation component has been subtracted. The cost function calculation unit calculates a cost function of the model on the basis of the derived sound source direction-of-arrival and the label, and updates the parameter of the model.

Advantageous Effects of Invention

According to a model learning device of the present invention, the sound source direction-of-arrival (DOA) estimation can be performed in online operation.

BRIEF DESCRIPTION OF DRAWINGS

FIG. 2 is a flowchart illustrating an operation of a model learning device according to Example 1.

FIG. 3 is a block diagram illustrating a functional configuration of a direction of arrival estimation device according to Example 1.

FIG. 4 is a flowchart illustrating an operation of a direction of arrival estimation device according to Example 1.

DESCRIPTION OF EMBODIMENTS

Figure 1:
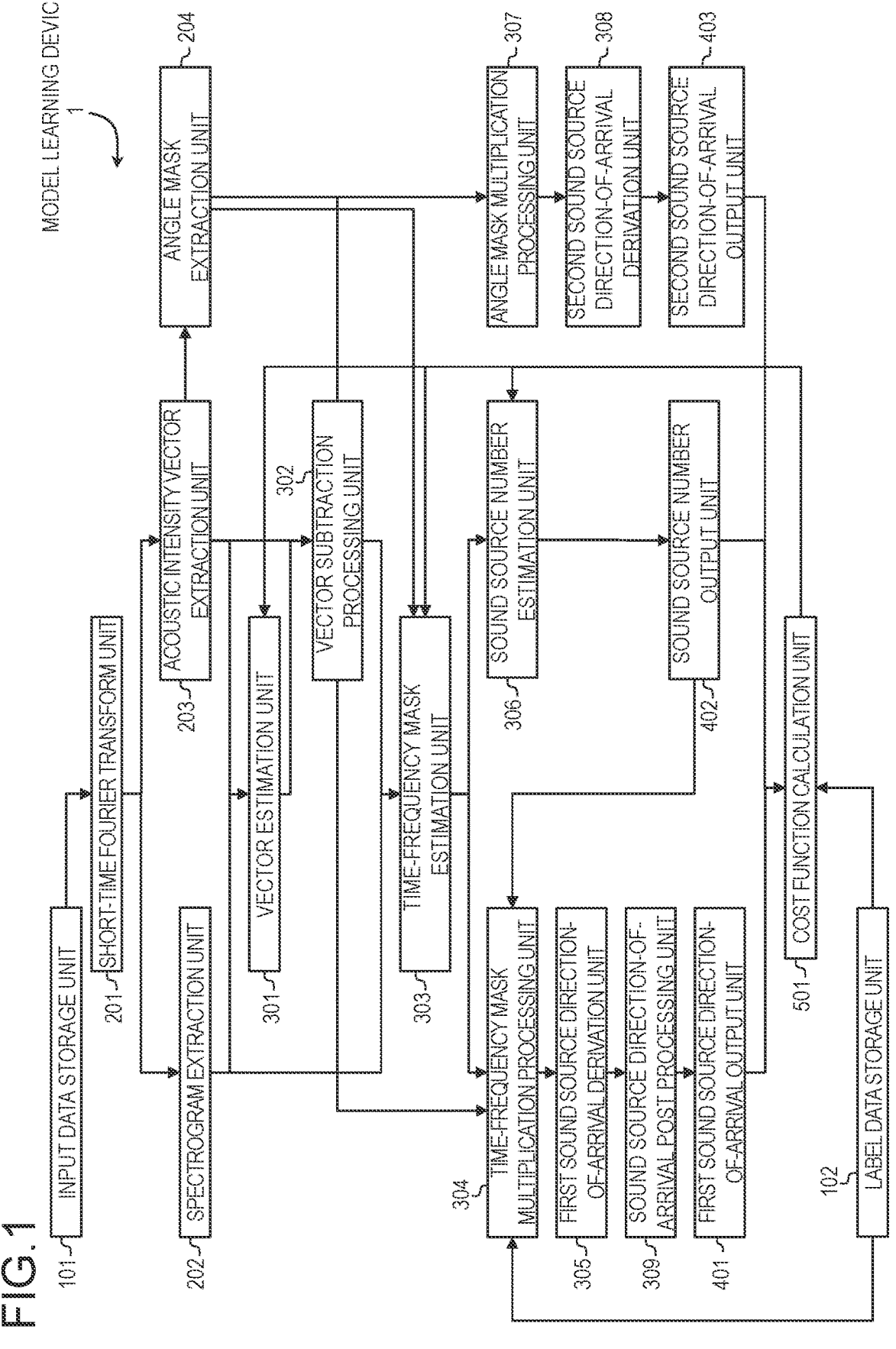
FIG. 1 is a block diagram illustrating a functional configuration of a model learning device according to Example 1.

Hereinafter, an embodiment of the present invention will be described in detail. Note that components having the same functions are denoted by the same reference numerals, and redundant description will be omitted.

Example 1

A model learning device and a direction of arrival estimation device according to the following example are characterized in that DOA estimation is extended to a form in which online operation is possible. A conventional technique of DOA estimation based on deep learning is a technique assuming an offline operation of performing inference on a recorded acoustic signal. When assuming an offline operation, it is possible to perform DOA estimation using an acoustic signal obtained in the future from the inference time, and a bidirectional recurrent neural network (Bi-RNN), which is a model structure using future information, is used for modeling a time structure in most DOA estimation based on actually most DNNs (Non Patent Literatures 5, 6, 7, and 8).

Accordingly, in order to achieve online operation of the system, it is necessary to replace the Bi-RNN with a unidirectional recurrent neural network (RNN) that does not use future information. However, if this replacement is performed in a data-driven approach, which is generally employed in DOA estimation based on DNNs, the estimation accuracy is significantly deteriorated near the start time of the event. On the other hand, the physics-based DOA estimation is mainly considered assuming online operation. In particular, the DOA estimation based on the IV has satisfactory time-angle resolution, and can be said to be a technique suitable for introduction of an online system in that the DOA can be estimated with satisfactory accuracy from an input in a very short time.

Therefore, a hypothesis that a decrease in accuracy caused by replacing the Bi-RNN with the RNN can be suppressed by performing online extension based on a hybrid system of the DOA estimation based on the IV and the estimation based on the DNN, which is robust to online operation, has been made, and this hypothesis has been verified. Actually, it has been confirmed in the example that the decrease in accuracy due to the introduction of an online system is suppressed to only one degree in the DOA estimation method of the hybrid system of physics and a DNN, in the model in which a Bi-RNN is replaced with an RNN.

Hereinafter, a DOA estimation technique for improving accuracy of IV-based DOA estimation using noise suppression and sound source separation using a DNN will be described.

In general, the input signal x in the time domain when there are N sound sources can be expressed as:

[Math. 7]

$$x = \sum_{i=1}^{N} s_i + n + \epsilon, \quad (7)$$

Here, $si$ is a direct sound of a sound source $i \in [1, \ldots, N]$, n is a noise uncorrelated with a target sound source, and c is another term (reverberation etc.) caused by the target sound source. Since the target signal can be expressed as the sum of these elements also in the time-frequency domain, the IV can be expressed as follows by applying this expression to Formula (3).

[Math. 8]

$$I_t = \sum_{f=1}^{F} \left( \sum_{i=1}^{N} I_{f,t}^{s_i} + I_{f,t}^{n} + I_{f,t}^{\epsilon} \right). \quad (8)$$

As can be seen from Formula (8), since the IV obtained from the observation signal includes not only a certain sound source i but also all the other components, the time series of the IV derived therefrom is affected by these terms. This is one of the factors of the weak property to decrease in an SNR, which is a drawback of a conventional method based on an IV. In order to overcome the drawbacks of the conventional method, it is considered to extract the acoustic intensity vector $I^{si}$ of the sound source $s_i$ from N overlapping sounds by performing noise suppression and sound source separation by multiplication by a time-frequency mask and vector subtraction. If it is considered that each element of Formula (8) is sufficiently sparse in the time-frequency space and has little overlap, it is known that these elements can be separated by a time-frequency mask (Non Patent Literature 15). Actually, this is a strong assumption, and it cannot be assumed that the noise term n is sufficiently sparse in time-frequency space. Therefore, in this example, $M^{si}_{f,t}$ $(1-M^{n}_{f,t})$, which is a combination of the time-frequency mask $M^{si}_{f,t}$ for separating the sound source $s_i$ and the time-frequency mask $M^{n}_{f,t}$ for separating the noise term n, is used. This process can be considered as a combination of two processes of noise suppression and sound source separation. Moreover, in a case where the term $\epsilon$ is reverberation, there is much overlap with the target signal on the time frequency, and it cannot be removed by the time-frequency mask. Therefore, in this example, $I^{\epsilon}_{f,t}$ is directly estimated and subtracted from the original acoustic intensity vector as a vector. These operations can be expressed as follows:

[Math. 9]

$$I_t^{s_i} = \sum_{f=1}^{F} M_{f,t}^{s_i} * \left( 1 - M_{f,t}^{n} \right) * \left( I_{f,t} - \hat{I}_{f,t}^{\epsilon} \right). \quad (9)$$

In the example of the present invention, since a case where the number of overlapping target sounds existing at the same time is two or less is treated, $1-M^{s1}_{f,t}$ can be used instead of $M^{s2}_{f,t}$. Therefore, we estimate the time-frequency masks $M^{n}_{f,t}$ and $M^{s1}_{f,t}$ and the vector $I^{\epsilon}_{f,t}$ using two DNNs.

In this example, the correction of the IV for the DOA estimation robust to noise and multiplex sound is expressed by Formula (9). However, a Bi-LSTM that is a kind of a Bi-RNN used in a DNN for estimating the time-frequency masks $M^{n}_{f,t}$ and $M^{s1}_{f,t}$ and the vector $I^{\epsilon}_{f,t}$ is replaced with an LSTM that does not use future information. A convolutional neural network is usually used in a preceding stage of the RNN for extraction of a high-order feature amount, and this portion is not a structure that uses future information and can be used as it is.

Moreover, if the inference is executed by inputting the entire sound source file that executes the inference at a time in order to utilize the use of the future information by the Bi-RNN, the number of time frames necessary for the inference is arbitrarily set and used for the inference among the acoustic signals obtained by the inference time in the online operation. Therefore, focusing on the property that the long-term time-series dependency of the LSTM can be stored as an internal state, the time frames to be inputted at a time are reduced to the minimum number of frames necessary for instantaneous extraction of the feature amount, so that the calculation amount per one-time inference is reduced.

[Model Learning Device 1]

Hereinafter, a functional configuration of a model learning device 1 according to the present embodiment will be described with reference to FIG. 1. As illustrated in FIG. 1, the model learning device 1 according to this example includes an input data storage unit 101, a label data storage unit 102, a short-time Fourier transform unit 201, a spectrogram extraction unit 202, an acoustic intensity vector extraction unit 203, an angle mask extraction unit 204, a vector estimation unit 301, a vector subtraction processing unit 302, a time-frequency mask estimation unit 303, a time-frequency mask multiplication processing unit 304, a first sound source direction-of-arrival derivation unit 305, a sound source number estimation unit 306, an angle mask multiplication processing unit 307, a second sound source direction-of-arrival derivation unit 308, a sound source direction-of-arrival post processing unit 309, a first sound source direction-of-arrival output unit 401, a sound source number output unit 402, a second sound source direction-of-arrival output unit 403, and a cost function calculation unit 501. Hereinafter, the operation of each component will be described.

<Input Data Storage Unit 101>

The input data storage unit 101 preliminarily stores 4-channel audio data (which will be hereinafter also referred to as acoustic data) of a first-order Ambisonics B format used for learning as input data. In this example, data in which the number of overlapping target sounds present at the same time is two or less is used.

<Label Data Storage Unit 102>

The label data storage unit 102 preliminarily stores the label data of the direction-of-arrival and the time of each acoustic event corresponding to the acoustic data stored in the input data storage unit 101. That is, it is assumed that the sound source direction-of-arrival is known at the time of learning, and a label indicating the sound source direction-of-arrival is stored in the label data storage unit 102 for each time.

<Short-Time Fourier Transform Unit 201>

The short-time Fourier transform unit 201 acquires the acoustic data stored in the input data storage unit 101 and executes STFT to obtain a complex spectrogram of the acoustic data (S201).

<Spectrogram Extraction Unit 202>

The spectrogram extraction unit 202 extracts a real number spectrogram to be used as the input feature amount of a DNN by using the complex spectrogram obtained in step S201 (S202). In this example, a log-mel spectrogram is used.

<Acoustic Intensity Vector Extraction Unit 203>

Using the complex spectrogram obtained in step S201, an acoustic intensity vector to be used as the input feature amount of the DNN is extracted according to Formula (3).

<Angle Mask Extraction Unit 204>

The angle mask extraction unit 204 receives the acoustic intensity vector obtained in step S203 as an input, and derives an azimuth angle $\phi^{ave}$ by Formula (6) in a state where noise suppression and sound source separation are not performed. The angle mask extraction unit 204 extracts a time-frequency mask for selecting a time-frequency bin having an azimuth angle larger than the derived azimuth angle $\phi^{ave}$ as the angle mask $M^{angle}_{f, t}$ (S204). In a case where two main sound sources are included in the input sound, this is a coarse sound source separation mask. In this example, this angle mask is used to derive an input feature amount of a DNN (MaskNet) and a regularization term of a cost function.

<Vector Estimation Unit 301>

The vector estimation unit 301 receives the real number spectrogram extracted from the complex spectrogram of the acoustic data, and the acoustic intensity vector extracted from the complex spectrogram as inputs, estimates the term $I^{\varepsilon}_{f, t}$ in Formula (8), that is, estimates the reverberation component of the acoustic intensity vector by a DNN model (VevtorNet), and outputs the reverberation component of the estimated acoustic intensity vector (S301). In this example, a DNN model obtained by combining a multilayer CNN and a long/short term memory recursive neural network (LSTM) is used.

<Vector Subtraction Processing Unit 302>

The vector subtraction processing unit 302 subtracts $I^{\wedge\varepsilon}_{f,}$ $_t$ estimated in step S301 from the acoustic intensity vector obtained in step S203 to obtain an acoustic intensity vector from which the reverberation component has been subtracted (S302).

<Time-Frequency Mask Estimation Unit 303>

The time-frequency mask estimation unit 303 receives the real number spectrogram, the acoustic intensity vector from which the reverberation component has been subtracted, and the angle mask as inputs, estimates the time-frequency masks $M^n_{f, t}$ and $M^{s1}_{f, t}$ for noise suppression and sound source separation by a DNN model (MaskNet), and outputs the time-frequency mask (S303). In this example, a DNN model having a similar structure except for the vector estimation unit 301 and the output unit is used.

<Time-Frequency Mask Multiplication Processing Unit 304>

The time-frequency mask multiplication processing unit 304 multiplies the time-frequency masks $M^n_{f, t}$ and $M^{s1}_{f, t}$ obtained in step S303 by the acoustic intensity vector from which reverberation has been subtracted obtained in step S302 (S304). However, in a case where the number of sound sources at a certain time is one, $M^{s1}_{f, t}=1$. The information on the number of sound sources is obtained from the label data stored in the label data storage unit 102 at the time of learning, and from the sound source number output unit 402 to be described later at the time of inference (in the case of the direction of arrival estimation device 2 to be described later).

<First Sound Source Direction-of-Arrival Derivation Unit 305>

The first sound source direction-of-arrival derivation unit 305 derives the sound source direction-of-arrival (DOA) by Formula (6) using the acoustic intensity vector obtained by applying the time-frequency mask to the acoustic intensity vector from which the reverberation component has been subtracted obtained in step S304 (S305).

<Sound Source Number Estimation unit 306>

The sound source number estimation unit 306 estimates the sound source existing section by a DNN model (NoasNet) (S306). In this example, the layers below the Bi-LSTM layer of the time-frequency mask estimation unit 303 are branched into NoasNet.

<Angle Mask Multiplication Processing Unit 307>

The angle mask multiplication processing unit 307 multiplies the angle mask $M^{angle}_{f, t}$ obtained in step S204 by the acoustic intensity vector from which the reverberation component has been subtracted obtained in step S302 (S307). However, in a case where the number of sound sources at a certain time is one, $M^{angle}_{f, t}=1$. The information on the number of sound sources is obtained from the label data stored in the label data storage unit 102.

<Second Sound Source Direction-of-Arrival Derivation Unit 308>

The second sound source direction-of-arrival derivation unit 308 derives the sound source direction-of-arrival (DOA) by Formula (6) using the acoustic intensity vector obtained by applying the angle mask to the acoustic intensity vector from which the reverberation component has been subtracted (S308).

<Sound Source Direction-of-Arrival Post Processing Unit 309>

The sound source direction-of-arrival post processing unit 309 performs post processing illustrated in Formula (10) on the DOA output in step S305 (S309).

$$DOA_{dis}=\text{round}(DOA/10°)*10° \qquad (10)$$

<First Sound Source Direction-of-Arrival Output Unit 401>

The first sound source direction-of-arrival output unit 401 outputs time-series data of a pair of the azimuth angle $\phi$ and the elevation angle $\theta$, which is the sound source direction-of-arrival derived in step S305 (S401).

<Sound Source Number Output Unit 402>

The sound source number output unit 402 outputs the result of the sound source existing section determination estimated in step S306 (S402). The result of sound source existing section determination is expressed in the form of a three-dimensional One-Hot vector corresponding to the three states 0, 1, and 2 of the number of sound sources, and the state having the largest value is expressed by the number of sound sources at that time.

<Second Sound Source Direction-of-Arrival Output Unit 403>

The second sound source direction-of-arrival output unit 403 outputs time-series data of a pair of the azimuth angle $\phi$ and the elevation angle $\theta$, which is the sound source direction-of-arrival derived in step S308 (S403). However, unlike step S401, the sound source direction-of-arrival (DOA) is obtained without using the output of step S303. This output is used to derive a regularization term in step S501 to be described later.

<Cost Function Calculation Unit 501>

The cost function calculation unit 501 calculates the cost function of the DNN model on the basis of the sound source direction-of-arrival outputted in steps S401 and S403, the estimation result of the sound source existing section outputted in step S402, and the label stored in the label data storage unit 102, and updates the parameter of the DNN model so that the calculation result decreases (S501). In this example, the following cost function is used.

$$L = L^{DOA} + \lambda_1 L^{NOAS} + \lambda_2 L^{DOA'} \tag{11}$$

Here, $L^{DOA}$, $L^{NOAS}$, and $L^{DOA'}$ are respectively DOA estimation, Noas estimation, and a regularization term, and $\lambda_1$ and $\lambda_2$ are positive constants. The $L^{DOA}$ is a mean absolute error (MAE) between the true DOA and the estimated DOA obtained as the output of step S401, and the $L^{NOAS}$ is a binary cross entropy (BCE) between the true Noas and the estimated Noas obtained as the output of step S402. The $L^{DOA'}$ is calculated similar to $L^{DOA}$ using the output of step S403 instead of the output of step S401.

«Stop Condition in Step S501»

Although the stop condition is not illustrated in the flowchart of FIG. 2, the learning is stopped when the DNN parameter is updated 120,000 times in this example.

[Direction-of-Arrival Estimation Device 2]

Hereinafter, a functional configuration of the direction of arrival estimation device 2 that uses a model learned by the above-described model learning device 1 will be described with reference to FIG. 3. As illustrated in the figure, the direction of arrival estimation device 2 of this example includes an input data storage unit 101, a short-time Fourier transform unit 201, a spectrogram extraction unit 202, an acoustic intensity vector extraction unit 203, an angle mask extraction unit 204, a vector estimation unit 301, a vector subtraction processing unit 302, a time-frequency mask estimation unit 303, a time-frequency mask multiplication processing unit 304, a sound source direction-of-arrival derivation unit 305, a sound source number estimation unit 306, a sound source direction-of-arrival post processing unit 309, a sound source direction-of-arrival output unit 401, and a sound source number output unit 402. Note that, although the sound source direction-of-arrival derivation unit 305 and the sound source direction-of-arrival output unit 401 have the same functions as the first sound source direction-of-arrival derivation unit 305 and the first sound source direction-of-arrival output unit 401 in the model learning device 1, "first" is omitted from the names of the functions since the device does not have a functional configuration corresponding to "second . . . unit".

The direction of arrival estimation device 2 of this example is configured by omitting the label data storage unit 102 that stores a functional configuration used only for calculation of a cost function from the functional configuration of the model learning device 1, and a label used for learning. The operation in the functional configuration common with the model learning device 1 is basically the same. Accordingly, the direction of arrival estimation device 2 executes steps S201, S202, S203, S204, S301, S302, S303, S306, S402, S304, S305, S309, and S401 described above (FIG. 4). Note that the information on the number of sound sources necessary for execution of step S304 is obtained from the sound source number output unit 402.

<Experimental Result>

Figure 5:
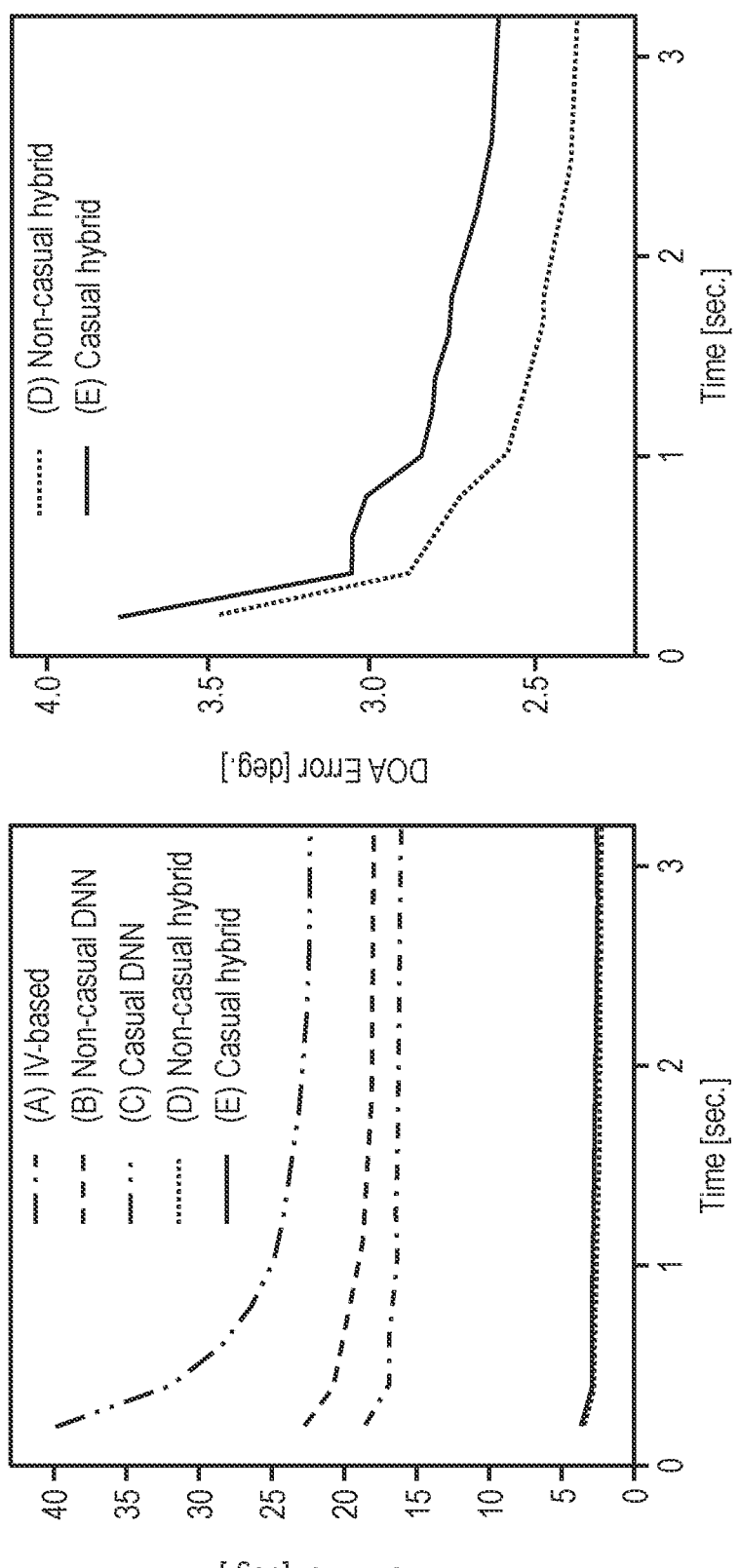
FIG. 5 is a diagram illustrating a result of performing time-series DOA estimation using a direction of arrival estimation device according to Example 1.

FIG. 5 illustrates an experimental result of performing time-series DOA estimation using the direction of arrival estimation device 2. The graphs in the figure show the tendency of accuracy deterioration near the event start time in each comparison technique. From comparison between (B) and (C), it is possible to confirm deterioration in accuracy of when (B) offline estimation is extended to (C) online estimation in a data-driven conventional technique based on a DNN (Non Patent Literature 1). In particular, accuracy deterioration of 70% or more is observed in about 1 second from the event start time. On the other hand, it can be confirmed from comparison between (D) and (E) that the accuracy deterioration is suppressed when (D) offline estimation is extended to (E) online estimation in the hybrid DOA estimation technique of a DNN and physics. Although the performance slightly deteriorates near the event start time, this tendency is common to (D) and (E).

<Appendix>

A device according to the present invention includes, for example, an input unit to which a keyboard or the like can be connected as a single hardware entity, an output unit to which a liquid crystal display or the like can be connected, a communication unit to which a communication device (e.g., a communication cable) capable of communicating with the outside of the hardware entity can be connected, a central processing unit (CPU in which a cache memory, a register, or the like may be included), a RAM or a ROM as a memory, an external storage device as a hard disk, and a bus that connects the input unit, the output unit, the communication unit, the CPU, the RAM, the ROM, and the external storage device so that data can be exchanged therebetween. Moreover, a device (drive) or the like that can read and write data from and to a recording medium such as a CD-ROM may be provided in the hardware entity as necessary. Examples of a physical entity including such a hardware resource include a general-purpose computer.

The external storage device of the hardware entity stores a program that is required for implementing the above-described functions, data that is required for processing of the program, and the like (the program may be stored, for example, in a ROM as a read-only storage device instead of the external storage device). Moreover, data or the like obtained by processing of the program is appropriately stored in a RAM, an external storage device, or the like.

In the hardware entity, each program stored in the external storage device (or ROM etc.) and data required for processing of each program are read into a memory as necessary, and are appropriately interpreted and processed by the CPU. As a result, the CPU implements a predetermined function (each component represented as . . . unit, . . . means, etc.).

The present invention is not limited to the above-described embodiment, and can be appropriately modified without departing from the gist of the present invention. Moreover, the processing described in the above embodiment may be executed not only in time-series according to the described order, but also in parallel or individually according to the processing capability of the device that executes the processing or as necessary.

As described above, in a case where the processing function of the hardware entity (the device according to the present invention) described in the above embodiment is implemented by a computer, processing content of the function of the hardware entity is described by a program. In addition, the computer executes the program, and thus the processing function of the hardware entity is implemented on the computer.

Figure 6:
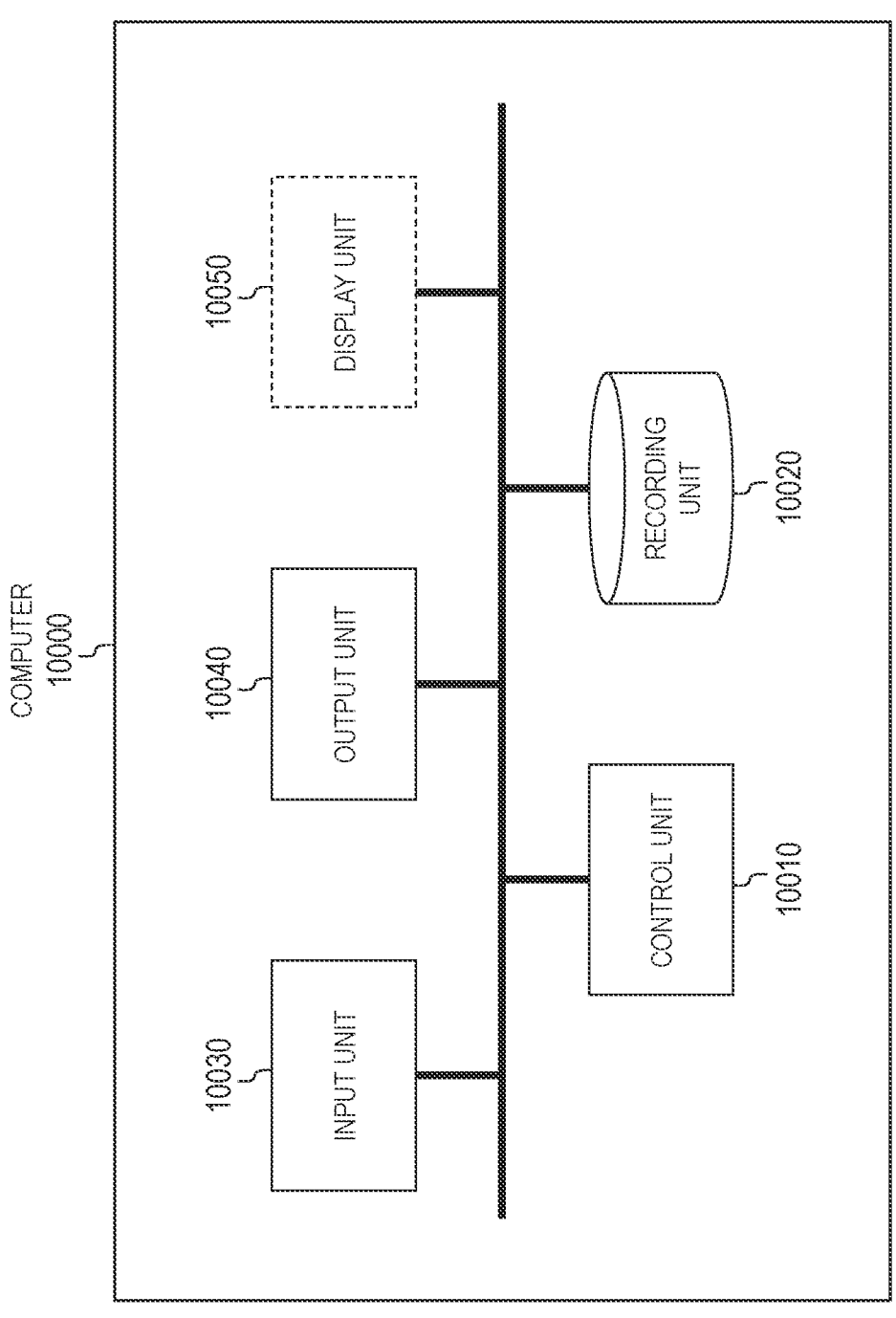
FIG. 6 is a diagram illustrating a functional configuration example of a computer.

Various processes described above can be carried out by causing a computer 10000 illustrated in FIG. 6 to read the program for executing each step of the method described above into a recording unit 10020 and causing a control unit 10010, an input unit 10030, an output unit 10040, and the like to operate.

The program describing the processing content may be recorded in a computer-readable recording medium. The computer-readable recording medium may be, for example, any recording medium such as a magnetic recording device, an optical disk, a magneto-optical recording medium, or a semiconductor memory. Specifically, for example, a hard disk device, a flexible disk, a magnetic tape, or the like can be used as the magnetic recording device, a digital versatile disc (DVD), a DVD random access memory (DVD-RAM), a compact disc read only memory (CD-ROM), a CD record-able/rewritable (CD-R/RW), or the like can be used as the optical disk, a magneto-optical disc (MO) or the like can be used as the magneto-optical recording medium, an electri-cally erasable and programmable-read only memory (EEP-ROM) or the like can be used as the semiconductor memory.

Moreover, distribution of the program is performed by, for example, selling, transferring, or renting a portable record-ing medium such as a DVD or a CD-ROM on which the program is recorded. Furthermore, a configuration in which the program is stored in a storage device in a server computer and the program is distributed by transferring the program from the server computer to other computers via a network may also be employed.

For example, the computer that executes such a program first temporarily stores the program recorded in a portable recording medium or the program transferred from the server computer in the storage device of the own computer. Then, at the time of execution of processing, the computer reads the program stored in a recording medium of the own computer and executes processing according to the read program. Moreover, as another embodiment of the program, a computer may directly read the program from a portable recording medium and execute processing according to the program. Furthermore, each time a program is transferred from a server computer to the computer, the computer may sequentially execute processing according to the received program. Moreover, the above-described processing may be executed by a so-called application service provider (ASP) type service that implements a processing function only by an execution instruction and result acquisition without trans-ferring the program from the server computer to the com-puter. Note that the program in the present embodiment includes information used for processing by an electronic computer and equivalent to the program (data or the like that is not a direct command to computer but has property that defines processing of the computer).

Moreover, although the hardware entity is configured by executing a predetermined program on a computer in the embodiment, at least some of the processing content may be implemented by hardware.

The invention claimed is:
1. A model learning device comprising:
processing circuitry configured to:
   receive a real number spectrogram extracted from a complex spectrogram of acoustic data having a label indicating a sound source direction-of-arrival ("DOA") for each time when the sound source direction-of-arrival is known, and an acoustic inten-sity vector ("IV") extracted from the complex spec-trogram as inputs, and output a reverberation com-ponent of the estimated acoustic intensity vector;
   receive the acoustic intensity vector as an input and extract, as an angle mask, a time-frequency mask for selecting a time-frequency bin having an azimuth angle larger than an azimuth angle derived in a state where noise suppression and sound source separa-tion are not performed;
   receive the real number spectrogram, the acoustic intensity vector from which the reverberation com-ponent has been subtracted, and the angle mask as inputs, and output a time-frequency mask for noise suppression and sound source separation;
   derive a first sound source direction-of-arrival on a basis of an acoustic intensity vector obtained by applying the time-frequency mask to the acoustic intensity vector from which the reverberation com-ponent has been subtracted;
   derive a second sound source direction-of-arrival on a basis of an acoustic intensity vector obtained by applying the angle mask to the acoustic intensity vector from which the reverberation component has been subtracted; and
   calculate a cost function of a model on a basis of the first derived sound source direction-of-arrival, the second derived sound source direction-of-arrival, and the label, and update, based on the calculated cost function of the model, a parameter of the model as training of the model, wherein the model after being trained estimates a sound source direction-of-arrival as an online operation with accuracy, the model is configured as a hybrid of IV-based DOA estimation and a deep neural network (DNN)-based estimation in the online operation, and the DNN represents a recurrent neural network comprising a unidirectional recurrent layer using forward infor-mation up to a current time, thereby estimating the sound source direction-arrival with accuracy while excluding feedback according to acoustic data from a future time.
2. A direction of arrival estimation device comprising:
processing circuitry configured to:
   receive a real number spectrogram extracted from a complex spectrogram of acoustic data, and an acous-tic intensity vector extracted from the complex spec-trogram as inputs, and output a reverberation com-ponent of the estimated acoustic intensity vector;
   receive the acoustic intensity vector as an input and extracts, as an angle mask, a time-frequency mask for selecting a time-frequency bin having an azimuth angle larger than an azimuth angle derived in a state where noise suppression and sound source separa-tion are not performed;
   receive the real number spectrogram, the acoustic intensity vector from which the reverberation com-ponent has been subtracted, and the angle mask as inputs, and output a time-frequency mask for noise suppression and sound source separation; and
   derive, by a trained model, a sound source direction-of-arrival on a basis of an acoustic intensity vector obtained by applying the time-frequency mask to the acoustic intensity vector from which the reverbera-tion component has been subtracted, wherein the trained model estimates a sound source direction-of-arrival as an online operation with accuracy, the model is configured as a hybrid of IV-based DOA estimation and a deep neural network (DNN)-based estimation in the online operation, and the DNN represents a recurrent neural network comprising a unidirectional recurrent layer using forward infor-mation up to a current time, thereby estimating the sound source direction-arrival with accuracy while excluding feedback according to acoustic data from a future time.
3. A model learning method comprising:
a step of receiving a real number spectrogram extracted from a complex spectrogram of acoustic data having a label indicating a sound source direction-of-arrival for each time when the sound source direction-of-arrival is known, and an acoustic intensity vector extracted from the complex spectrogram as inputs, and outputting a reverberation component of the estimated acoustic intensity vector;

a step of receiving the acoustic intensity vector as an input and extracting, as an angle mask, a time-frequency mask for selecting a time-frequency bin having an azimuth angle larger than an azimuth angle derived in a state where noise suppression and sound source separation are not performed;

a step of receiving the real number spectrogram, the acoustic intensity vector from which the reverberation component has been subtracted, and the angle mask as inputs, and outputting a time-frequency mask for noise suppression and sound source separation;

a step of deriving a sound source direction-of-arrival on a basis of an acoustic intensity vector obtained by applying the time-frequency mask to the acoustic intensity vector from which the reverberation component has been subtracted;

a step of deriving a sound source direction-of-arrival on a basis of an acoustic intensity vector obtained by applying the angle mask to the acoustic intensity vector from which the reverberation component has been subtracted; and a step of calculating a cost function of a model on a basis of the derived sound source direction-of-arrival and the label, and updating, based on the calculated cost function of the model, a parameter of the model as training of the model, wherein the model after being trained estimates a sound source direction-of-arrival as an online operation with accuracy, the model is configured as a hybrid of IV-based DOA estimation and a deep neural network (DNN)-based estimation in the online operation, and the DNN represents a recurrent neural network comprising a unidirectional recurrent layer using forward information up to a current time, thereby estimating the sound source direction-arrival with accuracy while excluding feedback according to acoustic data from a future time.

4. A direction of arrival estimation method comprising:

a step of receiving a real number spectrogram extracted from a complex spectrogram of acoustic data, and an acoustic intensity vector extracted from the complex spectrogram as inputs, and outputting a reverberation component of the estimated acoustic intensity vector;

a step of receiving the acoustic intensity vector as an input and extracting, as an angle mask, a time-frequency mask for selecting a time-frequency bin having an azimuth angle larger than an azimuth angle derived in a state where noise suppression and sound source separation are not performed;

a step of receiving the real number spectrogram, the acoustic intensity vector from which the reverberation component has been subtracted, and the angle mask as inputs, and outputting a time-frequency mask for noise suppression and sound source separation; and a step of deriving, by a trained model, a sound source direction-of-arrival on a basis of an acoustic intensity vector obtained by applying the time-frequency mask to the acoustic intensity vector from which the reverberation component has been subtracted, wherein the trained model estimates a sound source direction-of-arrival as an online operation with accuracy, the model is configured as a hybrid of IV-based DOA estimation and a deep neural network (DNN)-based estimation in the online operation, and the DNN represents a recurrent neural network comprising a unidirectional recurrent layer using forward information up to a current time, thereby estimating the sound source direction-arrival with accuracy while excluding feedback according to acoustic data from a future time.

5. A computer-readable non-transitory recording medium storing a computer-executable program instructions that when executed by a processor cause a computer to execute operations of the processing circuitry as configured in the model learning device according to claim 1.

6. A computer-readable non-transitory recording medium storing a computer-executable program instructions that when executed by a processor cause a computer to execute operations of the processing circuitry as configured in the direction of arrival estimation device according to claim 2.

* * * * *